Nov. 16, 1937.  G. W. CRABTREE  2,099,197
SPRING COVER
Filed March 2, 1935   3 Sheets—Sheet 3
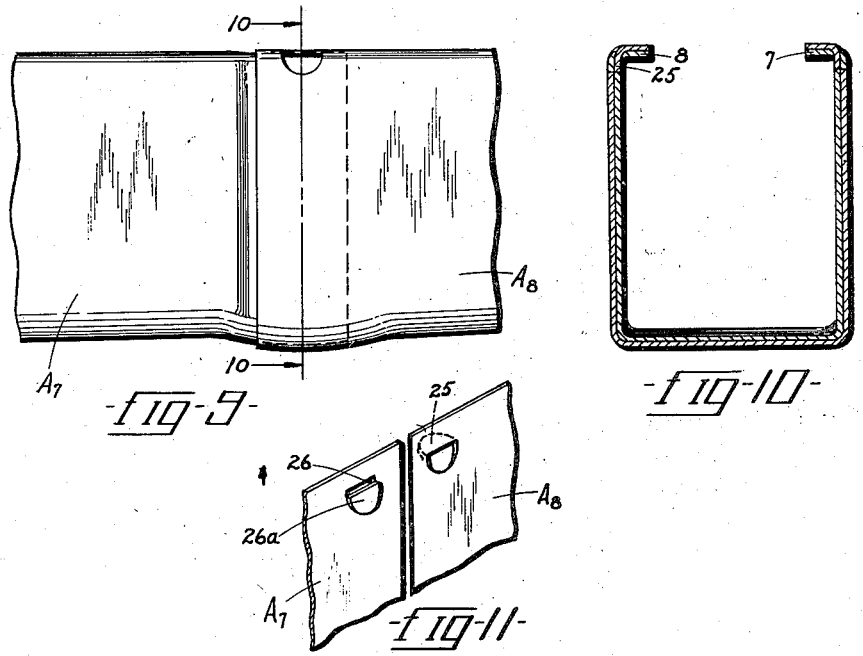
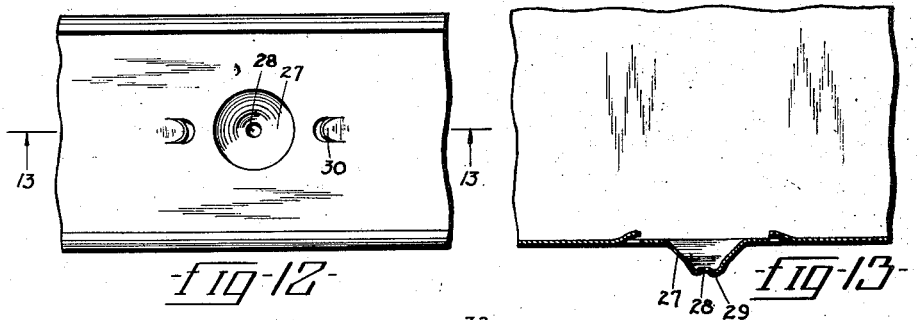
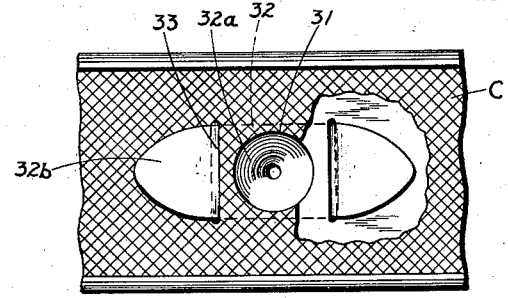
Inventor
GEORGE W. CRABTREE
Attorney Patented Nov. 16, 1937

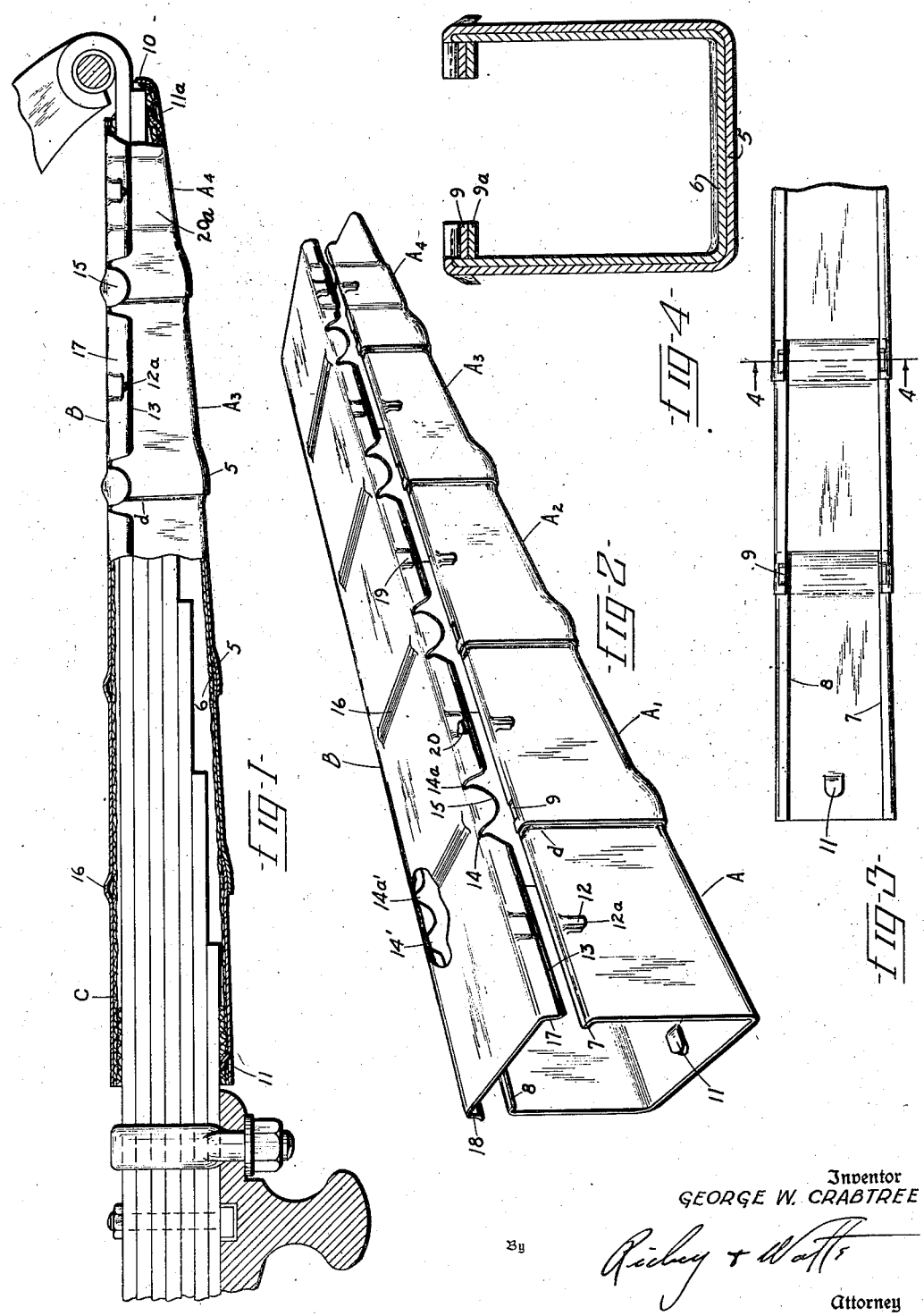

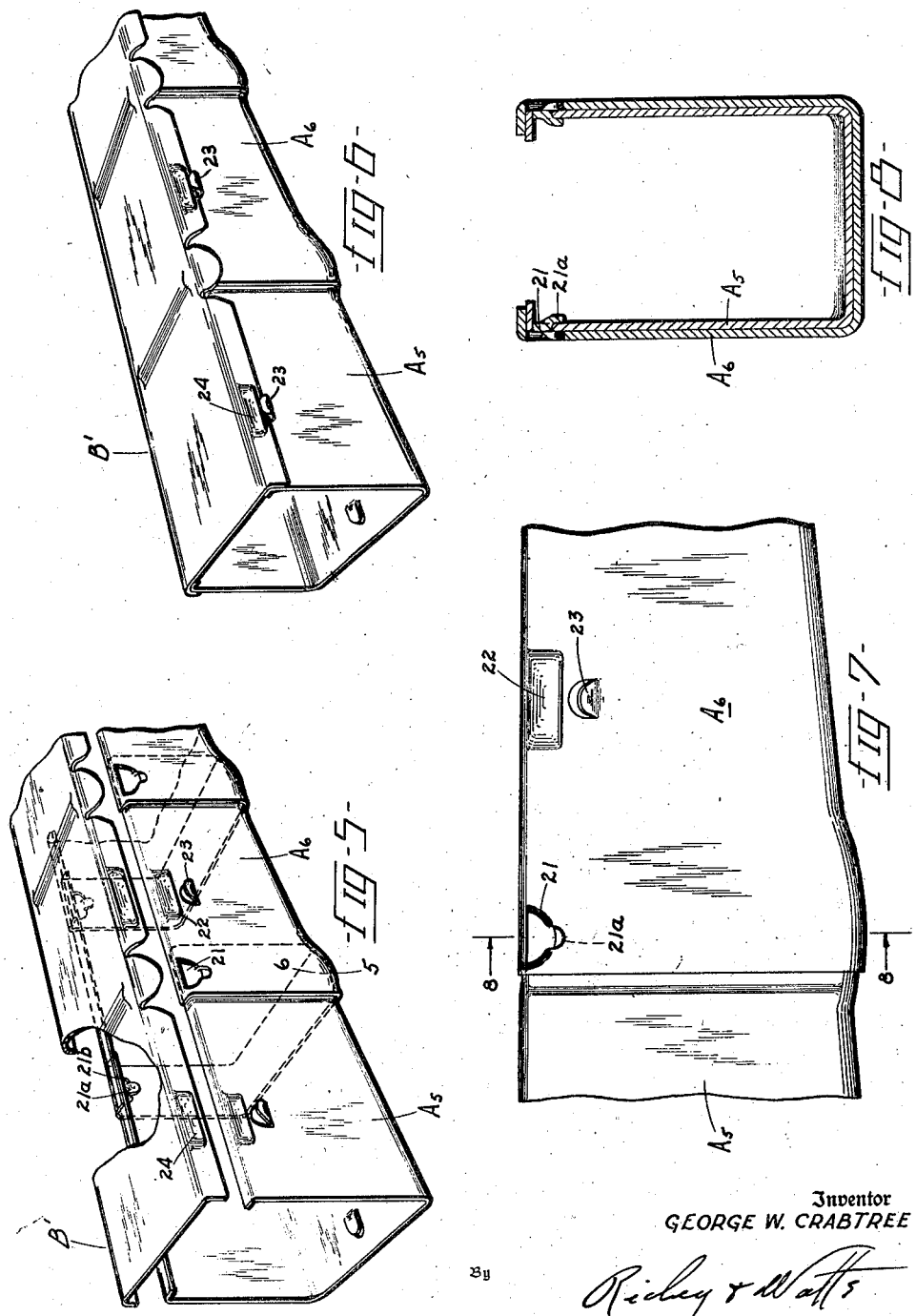

2,099,197

UNITED STATES PATENT OFFICE 2,099,197

SPRING COVER

George W. Crabtree, Cleveland Heights, Ohio

Application March 2, 1935, Serial No. 9,097

13 Claims. (Cl. 267—37)

This invention relates to improvements in covers or casings for laminated vehicle springs, and the primary object of the same is to provide a leaf spring cover of the sectional type which is practical and efficient in service and which at the same time is relatively simple in construction and assembly and capable of economical or low cost manufacture.

Other and more specific objects include:

The provision of a leaf spring cover of the section type embodying an improved joint which will facilitate flexure of the cover with the spring over a relatively wide range without becoming disorganized and which will more nearly conform to the flexing movements of the main spring leaf in conjunction with the remaining leaves; to provide a sectional spring cover assembly having an improved type of cap or top cover so constructed and arranged with respect to jointed body sections that the cover may be removed from the sections and the latter removed from the springs, if desired, easily and quickly and also applied or assembled on the spring in a like manner; to provide a cover assembly of the type specified embodying a cap or cover section and body sections having features of design which facilitate ease in stamping from sheet metal and which embody a minimum amount of metal; to provide a cover assembly having a plurality of body sections and a unitary or single-length top cover section capable of a wide range of flexure and capable of withstanding such flexure constantly and continuously without breaking; and, to provide in a spring cover assembly other features of improvement which will become apparent in view of the following description taken in conjunction with the drawings, wherein:

Figure 1 is a view in central longitudinal section and side elevation of a spring cover constructed in accordance with the present invention shown applied to a vehicle spring;

Figure 2 is a view in perspective with the cap suspended above the assembled body or box sections;

Figure 3 is a top plan view of a number of body sections in assembled relation with the cap removed;

Figure 4 is a transverse section taken about on the line 4—4, Figure 3;

Figure 5 is a broken fragmentary view in perspective of a modified type of cover assembly with the cap suspended over the body or box sections, and Figure 6 is a similar view with the cap applied to the body sections;

Figure 7 is a fragmentary view in side elevation of the body sections of Figures 5 and 6; and Figure 8 is a section taken about on the line 8—8, Figure 7.

Figure 9 is a view similar to Figure 7 of a further modification in structure; Figure 10 is a section on the line 10—10, Figure 9; and Figure 11 is a fragmentary view in perspective of the metal of the upper joint portions of the sections shown partially stamped out ready to be bent into final form.

Figure 12 is a fragmentary top plan view of a body or box section showing one method of providing a lubricating member therein; and Figure 13 is a section on the line 13—13, Figure 12.

Figure 14 is a view similar to Figure 12 of a modified structure with respect thereto.

The present invention includes certain features which are common to features disclosed in my copending application Serial No. 6,966, filed February 18, 1935.

Referring to the drawings in detail, and first to Figures 1 to 4, inclusive, the assembly comprises a plurality of jointed body or box sections generally indicated at A, $A^1$, $A^2$, $A^3$, $A^4$ and a cap or cover B. The body sections are substantially identical in construction, except the first and last sections, which have their respective outer ends adapted to the spring contour at these points and to also snugly engage and retain a liner C in position in the cover.

Considering, for example, the sections $A^1$ and $A^2$, the one end of $A^1$ telescopes partly into the section $A^2$, and at the bottom of the cover the ends are formed with interfitting arcuate bearing portions 5 and 6, note particularly Figure 1. This construction provides in effect a ball or rocking joint at the lower part of the section. This joint is substantially similar to that disclosed in my copending application above noted, except that in the present instance, the radius of the arc is preferably struck from the center of the hinge at the top of the section so as to provide true coacting bearing surfaces.

The sections are hinged to one another in a simple and effective manner and are also locked against separation by the hinge. With this in view, the upper opposed free edge portions of each of the sections are turned inwardly to provide opposed flanges 7 and 8, and at the point where the flanges telescope into one another, the metal is pressed downwardly into arcuate form as at 9 and 9a, the arc of the top flange being indicated at 9 and the arc of the lower flange being indicated at 9a. The joints 9, 9a and 5, 6 preferably have aligned centers. In pressing out this hinged structure, the metal is preferably but not necessarily severed adjacent the side wall of the section, note particularly Figure 4. In forming the hinge connection between adjacent sections, the flanges 7 and 8 may first be turned inwardly and the sections assembled in partly telescoped relation, and then the hinge 9—9a may be stamped out, thereby locking the sections together; or 9 and 9a may be formed before flanges 7 and 8 are turned, in which case the turning of flanges 7 and 8 will lock 9 and 9a in place. This joint is extremely simple and has been found highly satisfactory.

The small end or nose section A⁴ preferably has the free end thereof bent upwardly as at 10 over the end of the second leaf of the spring to assist in sealing the cover at this point.

The sections A and A⁴ are also preferably formed with tongues 11 and 11a which are adapted to engage the liner C and hold the latter in extended position in the cover assembly.

Means are provided for cooperative engagement with the cap B whereby the latter may be snapped into place and locked on the sections A to A⁴. Such means consist, in the form shown in Figures 1 to 4, inclusive, of a series of outwardly struck, locking lugs 12, there preferably being one to each section, the side wall preferably being cut arcuately to form the lower edge of the lug, leaving a sharply defined undercut locking lip 12a and a top tapered or rounded cam-like surface to facilitate application of the cap B, the latter being preferably formed with out-turned edges, as at 13, to further facilitate its application.

The particular contour of the lugs 12 and their respective locking lips 12a which result from the arcuate side wall cut constitute an important factor in the construction of the cover assembly, since by this means it is virtually impossible to accidentally dislodge the cap B from its applied position, yet at the same time it may be easily applied and removed manually. Suitable means may be provided to "tension" the cap with respect to the undercut lugs 12. Thus the flanges 7 and 8 may be turned upwardly so that they contact and exert "spring" on the cover, or the latter may be bowed upwardly at spaced points along the length thereof so that it will normally draw upwardly, or the edges 20, to be again referred to, will snap back under the lips 12a when the cap is released after being pressed down over the box sections during installation or assembly. The lugs 12 also are preferably of a uniform relatively small radius (I have found about $\frac{3}{32}''$ satisfactory) to give added strength to the lips 12a.

The cap B is preferably of integral or one-piece formation and to facilitate flexing of the cap without becoming displaced and to localize the flexing action in the region of the flanged joints, it is provided with a series of hinging or flexing notches or cut-out portions 14, 14' and 14a, 14a' in the region of the joints between the sections. Two pairs of these opposed flexing notches or cut-out portions are preferably used instead of a single pair so as to distribute the bending stresses over a wider area. A pair of tabs or stiffening tongues 15 is provided between each pair of cut-out portions.

Formed transversely between each opposed set of tabs or tongues 15 is a reinforcing rib 16. These ribs ensure against possible breakage of the cap at the point where the flexing action is greatest, viz., transversely between the opposed cut-out portions 14, 14' and 14a, 14a'. From practical experience, I have found that without these ribs, if any breakage took place under long continued service, it occurred transversely across the cap in the region of the recesses or cut-out portions 14 or 14a. Tests showed that when the cap was applied, the "spring" which resulted from the transverse spread of the cap flanges 17 and 18 caused a slight concavity longitudinally of the cap in the region of the hinge notches or cut-out portions, and then when the cap was flexed during service, the edges at the cut-out portions were placed under tension, which eventually started a break at this point and thence across the cap. The ribs prevent the concavity from forming initially, and a free transverse flexing area between the opposed cut-out portions is provided; and after these ribs were embodied in the cap, no further trouble was experienced.

The cap B is provided with opposed downturned flanges 17 and 18 adapted to engage over the side walls of the body sections, and along the length of these flanges a plurality of snap-on lugs 19 are pressed outwardly from the respective flanges, said lugs being adapted to coact with the lugs 12. When these lugs 19 are punched outwardly, the base of the lug is severed from the flange, leaving a locking edge 20, note particularly Figure 2, which engages under lips 12a of the lugs 12, note the side view in Figure 1.

The out-turned edges 13 of the flanges 17 and 18, in addition to facilitating application of the cap, also provide a stiffening and reinforcing means for the said flanges, especially in the region of the locking edge 20.

To ensure perfectly smooth or flat outer surfaces for the side walls and flanges of the box sections and a snug sealing fit for the cap B, the die is preferably relieved in the region of the joints about the thickness of the metal, thereby forming an equalizing "draw" where one section telescopes into its mating section as at d. Another advantage of this feature is that one die of generally uniform width may be used for simultaneously forming the entire group of box sections.

The method of assembling the cover on a spring should be apparent from the foregoing description taken in conjunction with the drawings. In Figure 2, the cap B is shown removed from the body or box sections A—A¹, etc., ready to be applied thereto, and in Figure 1 the cover is shown in place on a spring, the cap being pressed down in position on the box sections until the locking edges 20 engage over the lips 12a, whereupon pressure is released and the cap springs back slightly into locked position. The liner C is preferably attached to the assembled box sections through the medium of the tongues 11, 11a before the said sections are applied to the spring, a coating of lubricant being applied over the surface of the spring and/or inside of the liner prior to installation of the assembly. The box sections may be more easily applied by starting with the inner end and finishing with the nose or outer end. The cap B may then be snapped in position, preferably starting at the nose end of the sections and moving inwardly.

Certain of the sections may be bulged outwardly as at 20a to accommodate spring clips which may be of the type illustrated in my prior Patent No. 1,893,229, issued January 3, 1933.

The resulting cover is an extremely simple yet highly effective arrangement which may be manufactured at a remarkably low cost. The type of joint used permits liberal flexing action of the spring while at the same time provides a snug bearing which is completely sealed throughout the length of the spring. This type of joint also permits the cover to be easily installed on a spring regardless of whether the latter is planolinear or formed with an appreciable camber. Furthermore, there is no tendency of the sections to pry themselves open at the joints or become separated due to vibratory action or constant flexure of the spring while in service on the road. An advantage of the present invention is the provision of an integral or one-piece snap-on cap for a series of sections jointed along the main leaf thereby coacting in principle with the construction and flexing action of the spring and also simplifying the assembling operation as well as the manufacturing operation.

In Figures 5 to 8, inclusive, a modification in structure is shown relative to that first described. In this instance, the arcuate joints at 5 and 6 remain the same, the changes in construction residing in the hinge joint at the top of the section and the snap-on lugs for the cap B'. The hinge joint in this instance is preferably formed by pressing out a segment or half-round pivotal bearing portion 21 in the outer side wall of each of the sections, which segment at its lower extremity terminates in a locking tongue or tab 21a, the tongue being punched out from the side wall while the half-round or segmental pivotal bearing portion 21 remains connected thereto. The inner wall of the coacting telescoping section has a mating, partly cut-out segment 21b formed therein which receives the portion 21 and has the tongue 21a engaged thereover, note particularly Figures 5 and 8. The half-round portion or segment 21 is preferably formed with its straight edge as close to the top of the side wall of the body section as possible, so as to pivot, and to provide a hinge joint, at this point.

Snap-on lugs for the sections are indicated at 22. The lugs 22 perform substantially the same function as those indicated at 12 in Figures 1 to 4, inclusive, but in this instance the metal at the base of the lug is simply bulged outwardly. In this instance, also, the lug is preferably more elongated. The coacting snap-on lugs for the cap B' are indicated at 24, and these lugs are also simply bulged outwardly and do not have the metal severed at the base thereof. To lock the cap against displacement, locking tongues 23 are cut from the side walls of the respective sections. The method of assembly is substantially the same as in the form first described, except that the tongues 23 are bent inwardly to lock the cap in place.

In Figures 9, 10, and 11, a further modification in the hinge joint construction is shown, which is of a more simplified type than those previously described. In this instance, the sections are indicated at A⁷ and A⁸, and the hinge is formed by simply pressing a lip or locking tongue 25 from the side wall of the outer telescoping section and forming a slot 26 and segment 26a in registration with this tongue at the top flange of the mating section, the tongue being inserted in the slot and then flanges 7 and 8 bent inwardly seating tongue 25 in segment 26a. The preferred method of forming this hinged connection is partly illustrated in Figure 11, the tongue 25 being bent inwardly approximately 90° and slot 26 being formed in the metal prior to formation of the flange, and then the sections are arranged in telescoped relation with the tongue 25 in the slot 26, and then during the process of forming the flange the said tongue, being attached only to flanges 7 and 8, is carried downwardly toward the side wall of the section A⁷ and locked therein and is registered into segment 26a with a limited amount of pivotal play. This results in an extremely simplified type of hinge connection or joint which is also highly effective.

In Figures 12, 13, and 14, I have shown a simple method of forming a lubricant nipple or analogous member for facilitating lubrication of the interior of the cover assembly after it has been applied on the spring. In Figures 12 and 13, the nipple is indicated at 27 and is formed by simply pressing the metal outwardly and forming an opening or inlet 28 in the base of the nipple. It is preferred to first press the nipple out of the metal and then punch the center hole so that a deflecting flange 29 is formed around the hole on the inner side of the nipple, thereby providing means which assists in preventing escape of lubricant. To hold the liner C down in place around the lubricant nipple with the hole in the liner in alignment with the hole in the nipple, locking tongues 30 are preferably struck upwardly from the metal adjacent said nipple so that the liner may be inserted over these tongues and the latter bent downwardly to hold the liner in place and prevent displacement or shifting of the latter out of its original set position and ensure passage of the lubricant through to the inside of the liner to the spring.

Figure 14 shows a modification in structure with respect to that shown in Figures 12 and 13. In this instance, a hole 31 is cut out of the metal of the section and the lubricant nipple is in the form of a separate fitting 32 having a nipple portion 32a formed therein, the opposite extremities of the member being formed with locking ears or tongues 32b which are inserted through slots 33 formed in the base of the cover on opposite sides of the hole 31 and also through the liner C, and then bent downwardly over the latter. The nipple member 32 may be formed from sheet metal and may be applied at the time the cover is fabricated or during the life of the cover after the latter is in place on a spring.

From the foregoing, it will be seen that I have provided an extremely simple type of cover assembly of the box section type which may be manufactured at a relatively low cost and which at the same time is capable of long life and efficient service.

It will be understood that the method of formation and assembly of the various parts of the improved cover as set forth herein are simply given by way of example, and that other methods of fabrication and assembly may be adapted as well as minor changes in construction without departing from the scope of the invention as defined by the appended claims.

I claim:

1. A cover for leaf springs comprising a plurality of substantially U-shaped flanged body sections adapted to be inserted over three sides of a spring, said sections having their contiguous end portions arranged in telescoped relation, hinge joint connections struck from the flanges of the sections within the region of said end portions and arcuate shaped bearing joints formed in the walls of the sections opposite said hinge connections, a cap member adapted to fit over said sections and complete the assembly, and means for detachably securing the cap member to the sections.

2. A cover for leaf springs comprising a plurality of substantially U-shaped body sections adapted to be inserted over three sides of a spring, said sections having contiguous end portions arranged in telescoped relation and connected to one another to provide a series of hinge joints, a cap member having side flanges adapted to fit over the adjacent side walls of the sections, said side walls having pressed outwardly therefrom a series of locking lugs and the flanges of the cap also having pressed outwardly therefrom coacting snap-on lugs adapted to engage over said locking lugs when the cap is assembled on said sections, the locking lugs being formed with undercut locking lips adapted for locking engagement with the snap-on lugs.

3. A cover for leaf springs comprising a plurality of substantially U-shaped body sections adapted to be inserted over three sides of a spring, said sections having their contiguous end portions arranged in telescoped relation, the free edges of said sections being turned inwardly to provide flanges, the overlapping flanges of said end portions being locked together at a single point to provide a hinge connection, the bottom walls of the sections which lie within the region of said telescoped end portions being pressed outwardly in arcuate formation to provide a sealed bearing joint, a cap member adapted to be applied over the sections and having side flanges adapted to engage the side walls of said sections, and means for locking the flanges of said cap member to said latter walls.

4. In a cover assembly for leaf springs, a plurality of substantially U-shaped sheet metal sections having their free edges turned inwardly to provide flanges, the overlapping portions of said flanges having the metal thereof punched inwardly to provide a locking hinge joint between the sections, and an arcuate-shaped sealing bearing joint formed in the bottom walls of said sections in opposed relation to said joint.

5. A cover for leaf springs comprising a plurality of substantially U-shaped body sections adapted to be inserted over three sides of a spring, said sections having their contiguous end portions arranged in telescoped relation, the transverse telescoped walls of said end portions being pressed into arcuate bearing shapes to provide a uniformly sealed sliding joint and the opposed free edge portions of the sections being flanged and having the metal of the side walls adjacent said flanges pressed into the form of a hinge which engages in a cut-out portion or recess formed in the side wall of the coacting telescoped section, and a cap member adapted to overlie said sections and provided with means for engaging the latter.

6. A cover for leaf springs comprising a plurality of substantially U-shaped body sections adapted to be inserted over three sides of a spring, said sections having their contiguous end portions arranged in telescoped relation, the transverse telescoped walls of said end portions being pressed into arcuate bearing shapes to provide a sealed joint and the opposed free edge portions of the sections being flanged and having the metal of the side walls adjacent said flanges pressed into the form of an arcuate hinge bearing portion which engages in a cut-out or recess formed in the side wall of the coacting telescoped section, said hinged bearing portions being of segmental shape and having a locking tongue adjacent thereto which is passed through the recess in the adjacent wall of the section and bent downwardly to lock the sections together, and a cap member adapted to overlie said sections and provided with means for engaging the latter.

7. A cover for leaf springs comprising a plurality of substantially U-shaped body sections adapted to be inserted over three sides of a spring, said sections having their contiguous end portions arranged in telescoped relation, the transverse telescoped walls of the U-shaped sections being pressed into arcuate bearing shapes to provide a uniformly sealed bearing joint and the opposed free edge portions of said sections being formed with flanges, one of said flanges being formed with a slot in its telescoped end portion and the metal of the coacting telescoped section having a tongue cut therein adapted to engage in said slot and provide a hinge joint in cooperative relation with said arcuate bearing joint, and a cap member adapted to overlie said body sections and provided with means for engaging the latter.

8. In a sheet metal cover for leaf springs, in combination with a fabric liner having an opening therein for lubrication purposes and adapted to be disposed around the spring inside the cover, a lubricating attachment consisting of a strip of metal having a lubricating nipple pressed outwardly therefrom and having ears adapted to be passed through slots formed in the metal of said cover and through the fabric liner and turned down over the latter to hold the opening in the liner against displacement adjacent said nipple, the cover being formed with an opening in registration with said nipple.

9. In a cover assembly for leaf springs, a plurality of substantially U-shaped sheet metal sections having their free edges turned inwardly to provide flanges, the overlapping portions of said flanges having the metal thereof punched inwardly to provide a locking hinge joint between the sections, and an arcuate-shaped sealing bearing joint formed in the bottom walls of said sections in opposed relation to said hinge joint, a lubricating nipple pressed outwardly from the metal of one of said sections and having a central opening surrounded by a substantially conical shaped deflecting flange.

10. A spring cover having a body member proportioned to cover three sides of a laminated spring and a cap member proportioned to cover the fourth side of said spring, said body member comprising a series of separate U-shaped metallic sections arranged end to end and pivotally connected to each other at their adjoining ends adjacent the free edges thereof whereby said sections may flex with respect to each other in response to spring movement, said cap member comprising a one-piece strip having an axial extent substantially equal to the over-all length of said body member and having edge flanges to embrace the outer sides of said body member, said edge flanges cut away adjacent each of the interpivoted connections in the body sections and interlocking means formed on said edge flanges and said body sections to secure said cap to the body and restrict the flexure of the cap and body to the region of said interpivoted connection.

11. A spring cover having a body member proportioned to cover three sides of a laminated spring and a cap member proportioned to cover the fourth side of said spring, said body member comprising a series of separate U-shaped metallic sections arranged end to end and pivotally connected to each other at their adjoining ends adjacent the free edges thereof whereby said sections may flex with respect to each other in response to spring movement, said cap member comprising a one-piece strip having an axial extent substantially equal to the over-all length of said body member, a width exceeding the width of the body member and provided with longitudinal edge flanges adapted to embrace the outer side of said body member, said flanges cut away adjacent each of the inter-pivoted connections to permit the cap member overlying each of the sections to flex in unison with its respective body section, and interlocking means formed on said flanges and the body sections embraced thereby to secure the cap to the body section.

12. A spring cover having a body member proportioned to cover three sides of a laminated spring and a cap member proportioned to cover the fourth side of said spring, said body member comprising a series of separate U-shaped metallic sections arranged end to end and pivotally connected to each other at their adjoining ends adjacent the free edges thereof whereby said sections may flex with respect to each other in response to spring movement, said cap member comprising a one-piece strip having an axial extent substantially equal to the over-all length of said body member and having edge flanges to embrace the outer sides of said body member, said edge flanges cut away at each side of the inter-pivoted connections in the body sections to permit said cap member to flex at spaced points on each side of said inter-pivoted connection in the body in response to spring movement causing one body section to move with respect to the other and interlocking means formed in said edge flanges and said body sections in that edge of the body section embraced by said flanges to secure the cap to the body and restrict the flexure of the cap to points at each side of said inter-pivoted body connection.

13. A spring cover having a body member proportioned to cover three sides of a laminated spring and a cap member proportioned to cover the fourth side of said spring, said body member comprising a series of separate U-shaped metallic sections arranged end to end and pivotally connected to each other at their adjoining ends adjacent the free edges thereof whereby said sections may flex with respect to each other in response to spring movement, said cap member comprising a one-piece strip having an axial extent substantially equal to the over-all length of said body member and having edge flanges to embrace the outer sides of the free edges of said body member, said edge flanges cut away adjacent each of the inter-pivoted connections in the body sections, and a rib provided in said cap section extending transversely thereof and intersecting said cut-away portion of said flanges to localize the flexure in said cap section to the region of the inter-pivoted connections in the body section and to restrict said flexure to points on each side of said inter-pivoted connection whereby the degree of flexure at each of said points is limited to half of the flexure in the corresponding inter-pivoted body sections, and means on said edge flanges and body sections to secure the cap to the body and prevent movement of the cap with respect to the body in response to flexure of the spring.

GEORGE W. CRABTREE.